United States Patent
Mätzschker et al.

(10) Patent No.: US 6,758,782 B2
(45) Date of Patent: Jul. 6, 2004

(54) ACTUATING MECHANISM FOR AXIAL SETTING PURPOSES, HAVING A DOUBLE FUNCTION

(75) Inventors: Klaus Mätzschker, Nëunkirchen (DE); Karl-Heinz Hülsebusch, Köln (DE)

(73) Assignee: GKN Automotive GmbH (DE)

( * ) Notice: Subject to any disclaimer, the term of this patent is extended or adjusted under 35 U.S.C. 154(b) by 0 days.

(21) Appl. No.: 10/304,293

(22) Filed: Nov. 26, 2002

(65) Prior Publication Data

US 2003/0126935 A1 Jul. 10, 2003

(30) Foreign Application Priority Data

Dec. 6, 2001 (DE) .......................................... 101 60 026

(51) Int. Cl.⁷ .......................... F16H 37/02; F16D 47/00; F16D 19/00
(52) U.S. Cl. ...................... 475/218; 475/207; 192/48.4; 192/84.6
(58) Field of Search ...................... 74/56, 57; 475/225, 475/207, 209, 218, 203; 180/248; 192/84.6, 84.7, 48.2, 48.4

(56) References Cited

U.S. PATENT DOCUMENTS

| | | | | |
|---|---|---|---|---|
| 2,155,476 A | * | 4/1939 | Dooley | ........................ 475/207 |
| 3,110,189 A | * | 11/1963 | Steuer | .......................... 474/18 |
| 3,443,446 A | * | 5/1969 | Buergel | .......................... 74/56 |
| 5,485,904 A | * | 1/1996 | Organek et al. | ............... 192/35 |
| 6,231,470 B1 | * | 5/2001 | Cook et al. | .................. 475/206 |
| 6,302,251 B1 | * | 10/2001 | Fair et al. | ...................... 192/35 |

FOREIGN PATENT DOCUMENTS

EP      0825356 A2  *  2/1998

* cited by examiner

*Primary Examiner*—Roger Pang

(57) ABSTRACT

An actuating mechanism for axial setting purposes, comprising three discs which are supported co-axially relative to an axis and of which a central disc is rotatable relative to the two outer discs, between the central disc and each of the outer discs, there are arranged sets of balls, the balls each run in pairs of circumferential grooves in the faces of the central disc and of one of the outer discs facing one another, the circumferential grooves comprise a circumferentially variable depth whose extension is such that, over the entire relative angle of rotation, the first outer disc moves axially from a first end position via a central position into a second end position which deviates from said first end position, and the second outer disc moves axially from a first end position via a second end position deviating therefrom back into the first end position.

16 Claims, 8 Drawing Sheets

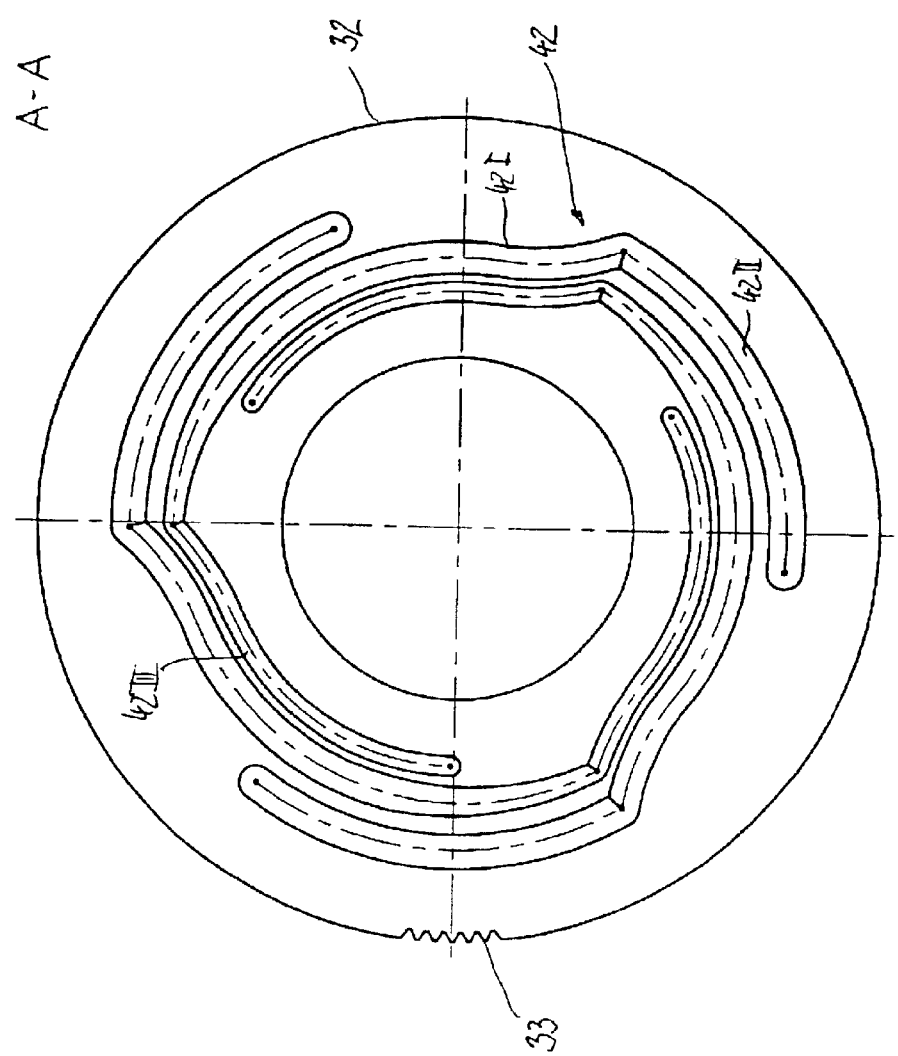

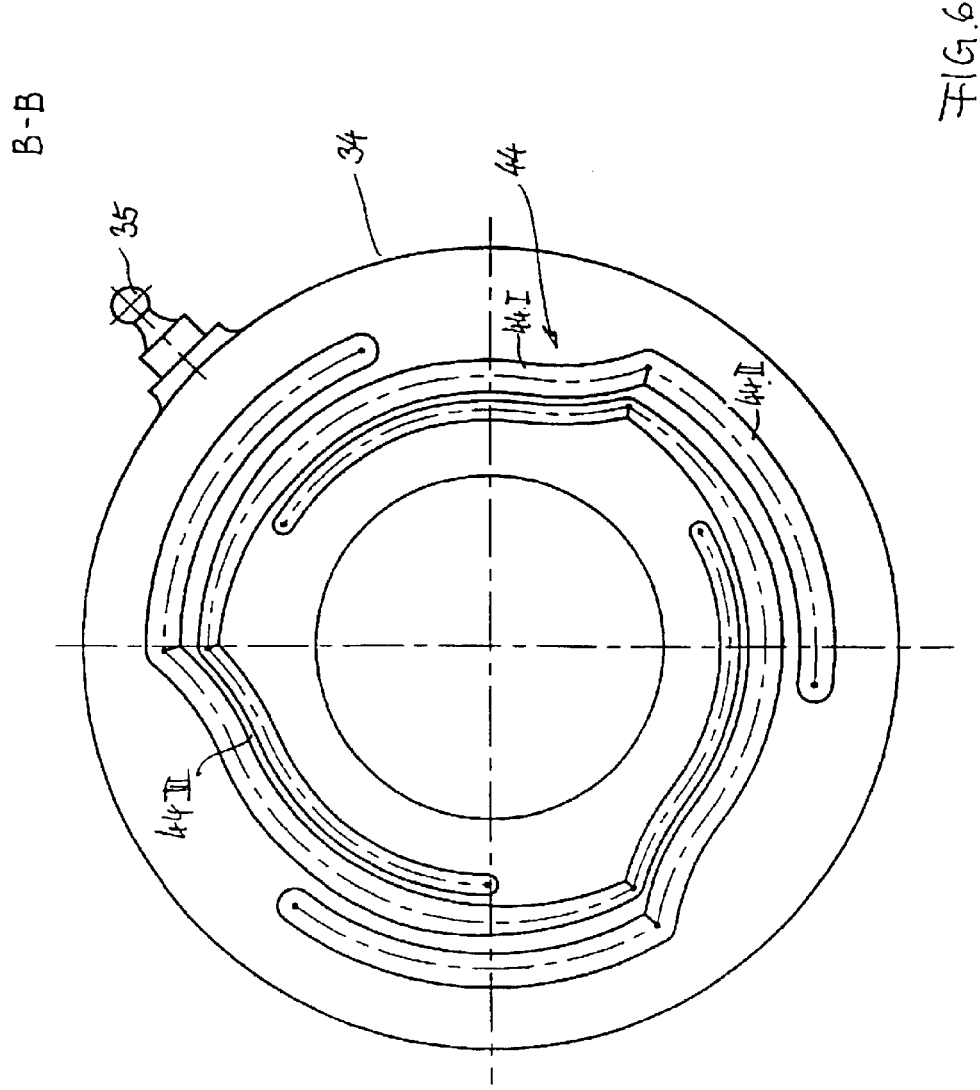

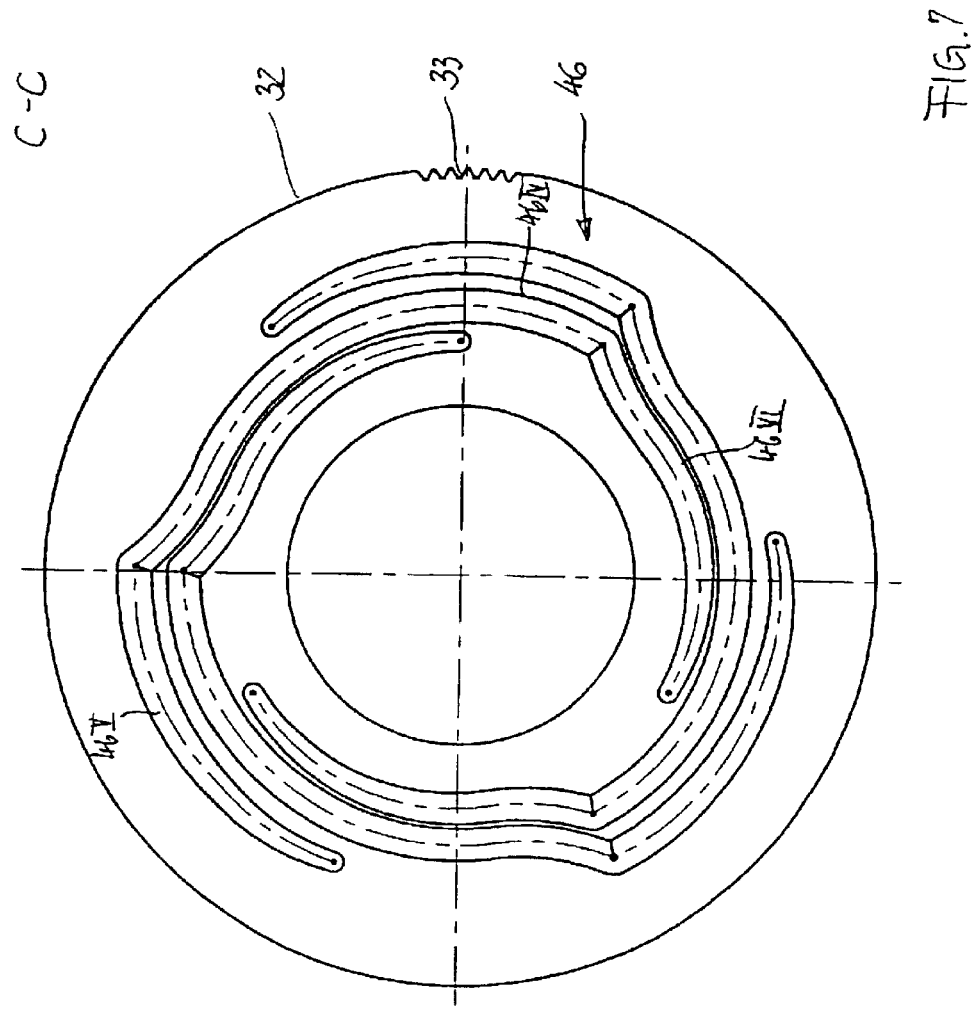

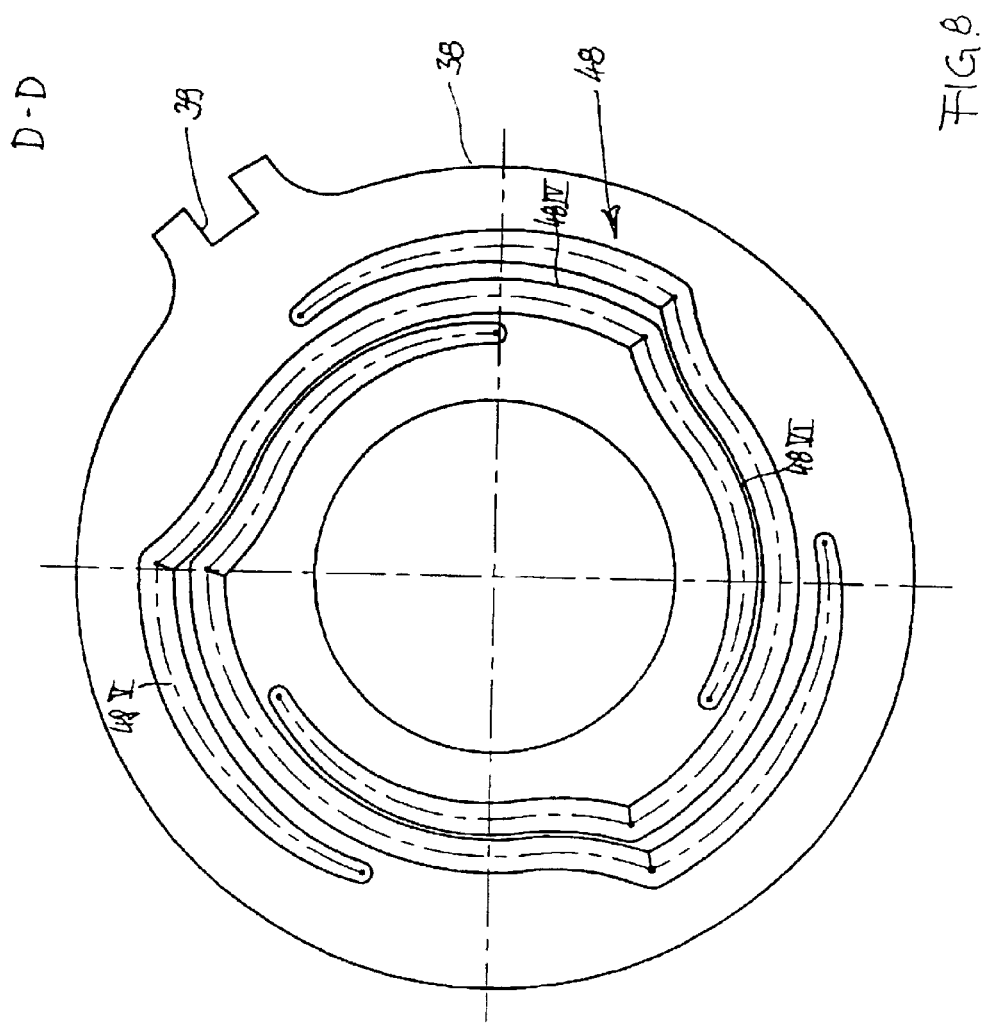

ated relative to the two outer discs. Between the central disc and each of the outer discs, there are arranged sets of balls. The balls each run in pairs of circumferential grooves in the faces of the central disc and of one of the outer discs facing one another. The circumferential grooves comprise a circumferentially variable depth.

Furthermore, the invention relates to an intermediate axle drive for vehicles driven by several axles.

BACKGROUND OF THE INVENTION

Actuating mechanisms of the foregoing type are known from DE 39 28 816 C2 and DE 40 07 506 C1 and from DE 41 06 503 C1 wherein the two outer discs are provided for alternately opening and closing two friction couplings in a manual gearbox whose gear-wheels can be coupled in a force-locking way to an associated shaft by means of the friction couplings.

From the publication "Integrated Transfer Case" by K. Lippitsch, submitted at the conference "Tagung Allradtechnik" (Conference Four-wheel Technology) taking place from Feb. 10, 11, 2000 in "Haus der Technik e.V.", there is known an intermediate axle drive concerning a two-stage gearbox and a central differential with one locking coupling. The locking coupling is actuated by a ball ramp mechanism with two co-axially supported discs, whereas the two stage drive is switched by a switching claw which can be actuated via an electromagnetic axial setting device.

SUMMARY OF THE INVENTION

It is an object of the invention to provide a setting mechanism of the initially named type which can be used for setting processes of different kinds, such as in intermediate axle drives.

The present invention provides an actuating mechanism of the foregoing type wherein, over the entire relative angle of rotation, the first outer disc moves axially from a first end position via a central position into a second end position which deviates from the first end position, and the second outer disc moves axially from a first end position via a second end position deviating therefrom back into the first end position.

Furthermore, the present invention provides an intermediate axle drive for a vehicle driven by several axles, comprising a two-stage gearbox and a follow-up central differential with a locking coupling. The intermediate axle gearbox comprises an actuating mechanism for axial setting purposes comprising three discs which are supported co-axially relative to an axis and of which a central disc is rotatable relative to the two outer discs. Between the central disc and each of the outer discs, there are arranged sets of balls, the balls each run in pairs of circumferential grooves iii the faces of the central disc and of one of the outer discs facing one another. The circumferential grooves comprise a circumferentially variable depth whose extension is such that, over of the entire relative angle of rotation, the first outer disc moves axially from a first end position via a central position into a second end position which deviates from the first end position. The second outer disc moves axially from a first end position via a second end position deviating therefrom back into the first end position. The first outer disc is connected by means of a shift fork to a gearshift sleeve for the two-stage gearbox and the second outer disc acts on a pressure plate of the locking coupling of the central differential.

In this way, it is possible to provide a device which, by means of standard rotary driving means, can achieve two different setting functions.

The central disc can be driven by a rotary drive and the outer discs can be held in a rotationally fast way in a housing, or the central disc can be held in a rotationally fast way in a housing and the outer discs can be driven synchronously by the rotary drive. Finally, by making use of a stage which reverses the direction of rotation, it is not impossible for the central disc and the outer discs to be driven simultaneously in opposite directions of rotation by the rotary drive.

With regard to a preferred use as an actuating mechanism for a two-stage gearbox and a locking coupling in an intermediate axle differential, the first outer disc, for example, over a first range of the angle of rotation, holds, without changing, its first end position; and over a second range of the angle of rotation, is axially transferred into the second end position; and, over a third range of the angle of rotation, holds, without changing, the second end position. The second outer disc, over the first range of the angle of rotation, changes from its first end position into the second end position; over the second range of the angle of rotation, holds, without changing, the second end position; and, over the third range of the angle of rotation, axially changes back from the second end position into the first end position.

In this way, the available relative range of rotation is divided into three. Thus, in a central range of rotation, the locking coupling of the differential drive is opened, with the two-stage gearbox being shifted from the first stage into the second stage, whereas in the two end ranges of the range of rotation, the gear stage as shifted is retained, and the locking coupling of the central differential is going to be progressively closed.

The central range for shifting between the two gear stages is divided up in such a way that within the axial shifting movement, there is additionally provided a central range in which a neutral position between the two gear stages is retained, without being changed, over a certain range of the angle of rotation of the discs. The respective position as set or the coupling condition can be recorded by a sensor at the central disc or at an element of the rotary drive of the disc.

The differential drive can, for example, be a planetary drive whose input shaft carries the web with the planetary gears, whose sun gear is connected to a first output shaft and whose hollow gear is positioned on a hollow shaft which rotates with the first output shaft and which, via an intermediate gear, drives a second output shaft. The locking device can be a multi-plate clutch which is effective between the web and hollow gear and which can be loaded via a pressure plate and an axial bearing by the second disc.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiment illustrated in greater detail in the accompanying drawings and described below by way of examples of the invention.

In the drawings:

FIG. 5 is a first view of the central one of the discs, as seen from the first outer disc.

FIG. 6 is a view of the first outer disc, as seen from the central disc.

FIG. 7 is a second view of the central one of the discs, as seen from the second outer disc.

FIG. 8 is a view of the second outer disc, as seen from the central disc.

DETAILED DESCRIPTION OF THE INVENTION

Figure 1:
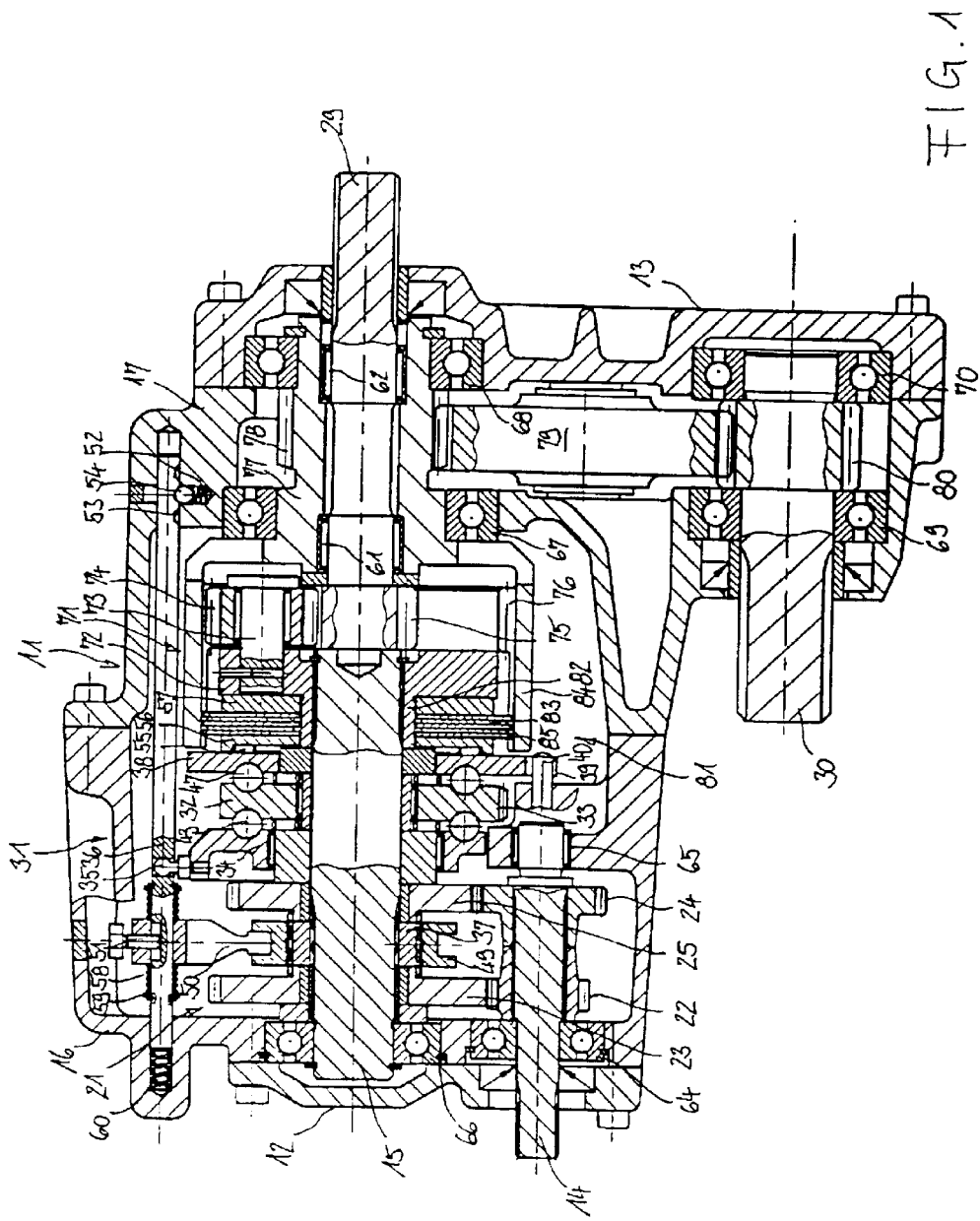
FIG. 1 shows a longitudinal section through an intermediate axle differential with an inventive actuating mechanism for axial setting purposes.

FIG. 1 shows an intermediate axle differential drive whose drive housing 11 comprises a cover 12 with a passage and a second cover 13 with a passage and bearing portions. The drive housing 11 comprises two housing halves 16, 17. In the housing, there is supported an input shaft 14, an intermediate shaft 15 and two output shafts 29, 30. The input shaft 14 and the intermediate shaft 15 form a two-stage gearbox 21 which can be made to engage in two different reduction stages by way of two pairs of gearwheels 22, 23, 24, 25 of different sizes, each of which are permanently engaged. The gearwheels 22, 24 are permanently coupled to the input shaft 14 in a rotationally fast way. The gearwheels 23, 25 which are rotatably supported on the intermediate shaft 15 can, via a gearshift sleeve 49, be alternately coupled to a gearshift sleeve carrier 37 which is secured in a rotationally fast way between the gear wheels 23, 25 on the intermediate shaft 15. Between its two positions of engagement with one of the gearwheels 23, 25, the gearshift sleeve 49 can be moved into a neutral position which is indicated in the drawing. Both gearwheels 23, 25 rotate freely relative to the intermediate shaft 15. The intermediate shaft 15 drives the two output shafts 29, 30 via a lockable planetary drive 71. Directly on the intermediate shaft 15 there is positioned the web 72 of the planetary drive, into which web 72 there are inserted journals 73 which rotatably support planetary gears 74. The planetary gears engage a sun gear 75 which is secured on the first output shaft 29. Furthermore, the planetary gears engage a hollow gear 76 which is produced so as to be integral with a hollow shaft 77 which is rotatably supported in the housing 11 by ball bearings 67, 68. The hollow shaft 77 carries a pinion 78 which engages an intermediate gear 79 which, in turn, engages a pinion 80 on the second output shaft 30. A multi-plate clutch 81 is effectively arranged between the web 72 and the hollow gear 76 of the planetary drive 71. Outer coupling plates 85 are positioned in a coupling carrier 84 formed on to the hollow gear 76 and rotate therewith. Inner coupling plates 83 are positioned on a sleeve 82 which is formed on to the web 72 and rotates therewith. If the multi-plate clutch 81 is in the open condition, the planetary drive 71 acts as an open differential drive. The web 72 with the planetary gears 74 is driven by the intermediate shaft 15, with the planetary gears 74 driving the sun gear 75 and the hollow gear 76 at identical rotational speeds and with a torque distribution which corresponds to the ratio of the diameters of same, i.e. with an uneven torque distribution. Differences in the rotational speeds between the sun gear 75 and the hollow gear 78 and thus between the first output shaft 29 and the second output shaft 30 can be offset by rotating the planetary gears 74 on their journals 73. If the multi-plate clutch 81 is closed, the differential effect is blocked in that the hollow gear 76 is coupled to the web 72. As a result, the planetary gears 74 are held by the journals 73 in the hollow gear, so that the sun gear 75 is driven via the stationary planetary gears 74 at the same rotational speed as the hollow gear 76 by the web 72. The hollow shaft 77 is thus coupled to the first output shaft 29. The second output shaft 30 is thus driven via the gearwheel chain 78, 79, 80 at a fixed transmission ratio relative to the first output shaft 29 by the intermediate shaft 15.

The setting mechanism 31 causes the multi-plate clutch 81 to be opened as well as closed; it also causes the two-stage gearbox 21 to be shifted between a first gear stage 22/23, a neutral position and a second gear stage 24/25. The mechanism 31 comprises a central disc 32 which is rotatable via a tooth segment 33 by a rotary drive (not shown) relative to the intermediate shaft 15, a first outer disc 34 which, via a driving head 35 engaging a shifting rod 36 supported in the housing, is supported in a rotationally fast way relative to the housing, as well as a second outer disc 38 which, via a driving claw 39, is held in a rotationally fast way relative to the housing on a holding pin 40 inserted into the housing. Between the central disc 32 and the first outer disc 34 there are effective balls 43 which run in first ball grooves 42 in the central disc 32 and in second ball grooves 44 in the first outer disc 34. Between the central disc 32 and the second outer disc 38, there are effective second balls 47 which run in third ball grooves 46 in the central disc 32 and in fourth ball grooves 48 in the second outer disc 38. As a result of the shape of the ball grooves which will be explained in greater detail below, a rotation of the central disc 32 relative to the first outer disc 34 can result in an axial displacement of the first outer disc 34 and thus in an axial displacement of a shifting yoke 50. The shifting yoke 50 is positioned on the shifting rod 36 and is fixed on the shifting rod 36 between pairs of supporting springs 58 and securing rings 59 in an axially resilient way and by means of a bolt 51 in a rotationally fast way. At one end, the shifting rod 36 is supported on a pressure spring 60 in the housing 11 and at its other end it comprises three engaging notches 53 which can co-operate with an engaging ball 54 supported on the pressure spring 52 in three shifted positions. Via the shifting rod 36, the pressure spring 60 holds the discs 34, 32, 38 and the balls 43, 47 in contact with one another and effects the return of the setting mechanism 31. The three shifted positions correspond to the two transmission stages and the neutral position of the two-stage gearbox. The shape of the ball grooves, furthermore, ensures that a rotation of the central disc 32 relative to the second outer disc 38 results in an axial displacement of the latter second outer disc which, via an axial bearing 55 and a pressure ring 56, acts on the multi-plate clutch 81 which is supported on a supporting disc 57 and is able to open or close same in the two outer positions. The input shaft 14 is supported in the housing 11 by means of rolling-contact bearings 64, 65. Furthermore, the intermediate shaft 15 is supported by a ball bearing 66 and held in the planetary gears 74. The hollow shaft 77 is supported by ball bearings 67, 68 in the housing and cover 13 respectively. The output shaft 29 is supported by needle bearings 61, 62 in the hollow shaft 77 and the second output shaft 30 is supported by ball bearings 69, 70 in the housing and cover 13 respectively.

Figure 2:
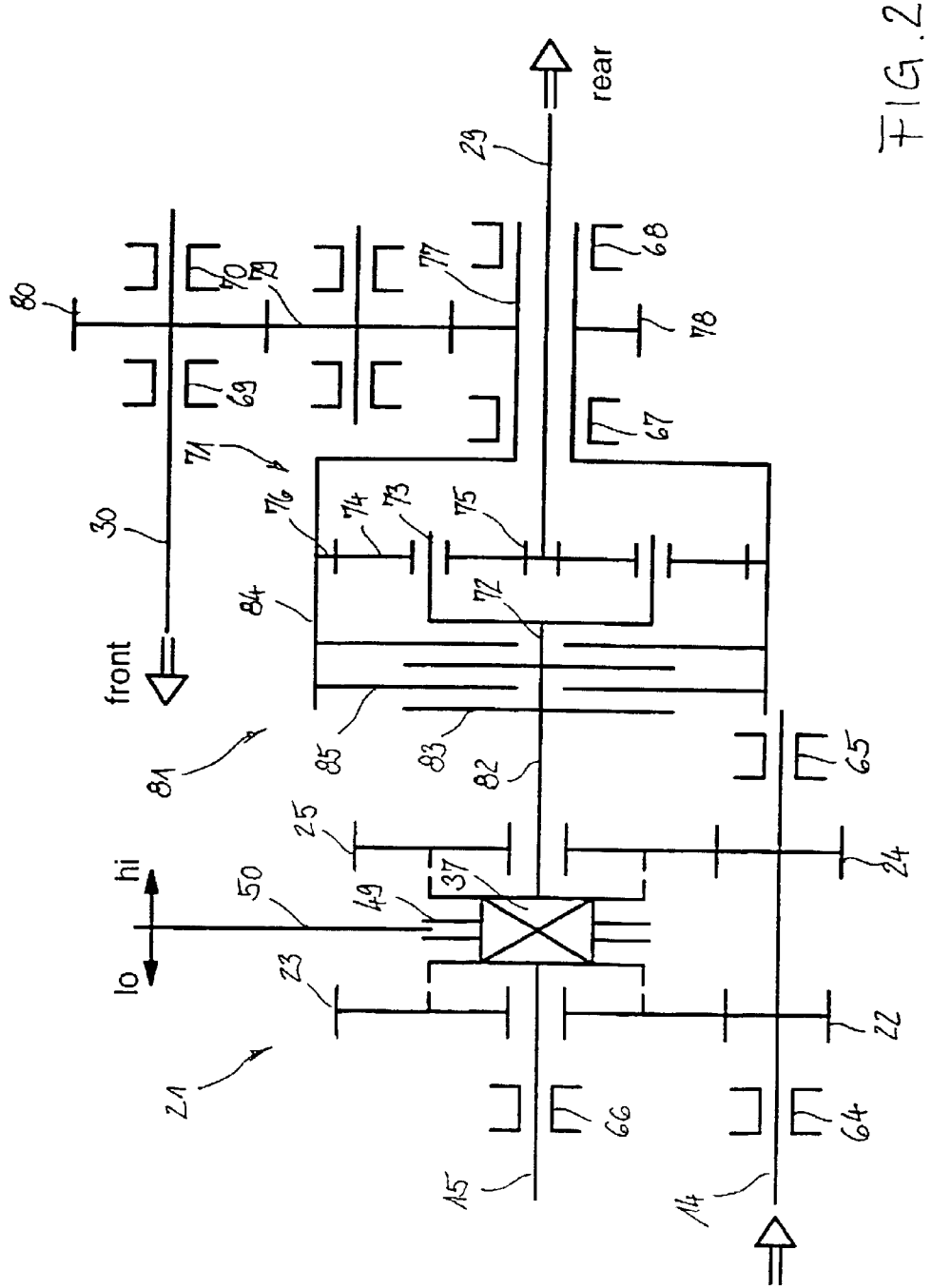
FIG. 2 shows a schematic diagram of the intermediate axle differential according to FIG. 1.

FIG. 2 shows a schematic diagram of the drive assembly according to FIG. 1 with its respective parts. FIG. 2 shows how the two-stage gearbox 21, the multi-plate clutch 81 and the planetary drive 71 are associated with one another and how they cooperate with the shafts 14, 15, 29, 30. However, the setting device 31 is eliminated altogether in FIG. 2. Any parts which are identical with the ones in FIG. 1 have been given the same reference numbers. The illustration of the two-stage gearbox 21 explains in which way a displacement of the gearshift sleeve 49 by means of the shifting yoke 50 on the gearshift sleeve carrier 37 effects a change between the transmission stage low (gearwheels 22, 23 effective because the gearwheel 23 is coupled to the gearshift sleeve carrier 37) and the transmission stage high (gearwheels 24, 25 effective because the gearwheel 25 is coupled to the gearshift sleeve carrier 37). When the multi-plate clutch 81 is open, the planetary drive 71 is an open differential drive which permits differences in rotational speeds between the output shaft 29 towards the rear axle and the output shaft 30 towards the front axle. When the multi-plate clutch 81 is closed, the planetary drive 71 rotates in the form of a block and the first output shaft 29 and the hollow shaft 77 and thus also the second output shaft 30 are driven at identical rotational speeds.

Figure 3:
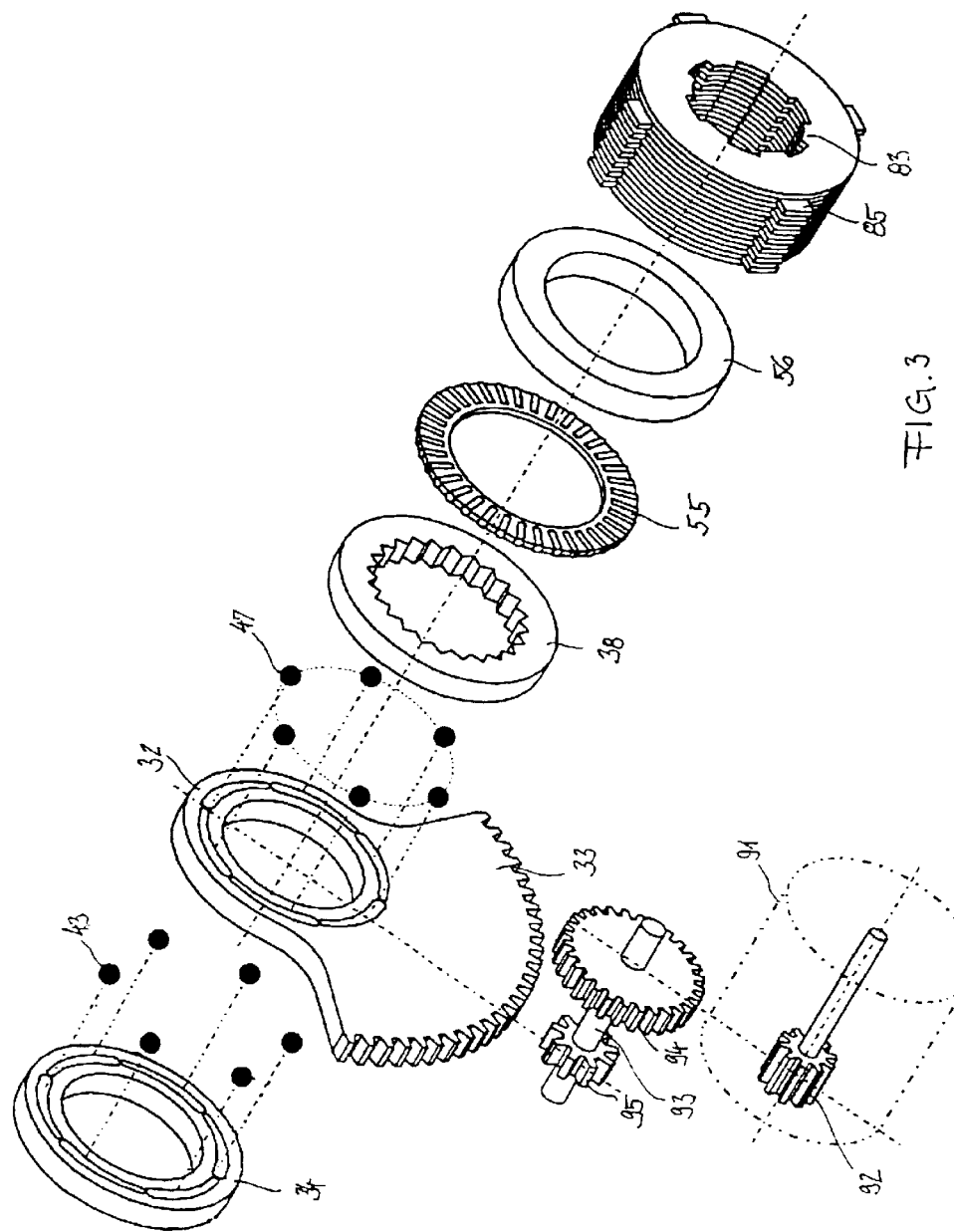
FIG. 3 shows parts of the actuating mechanism for axial setting purposes according to FIGS. 1 and 2 in an exploded view.

FIG. 3 shows several of the functional parts of the axial setting device 31 in an exploded view, with the reference numbers being the same as before. The central disc 32 with the tooth segment 33 cooperates via a reduction stage 93 with the driving pinion 92 of a drive 91 (not shown in detail). The reduction stage 93 comprises two gearwheels 94, 95. It can be seen that the first outer disc 34, the second outer disc 38, the axial bearing 55, the pressure ring 56, the plates 83, 85 and the supporting ring 57 of the multi-plate clutch 81 are arranged co-axially relative to the central disc 32. The sets of balls 43, 47 are arranged between the discs. The ball grooves in the discs will be described in greater detail below.

Figure 4:
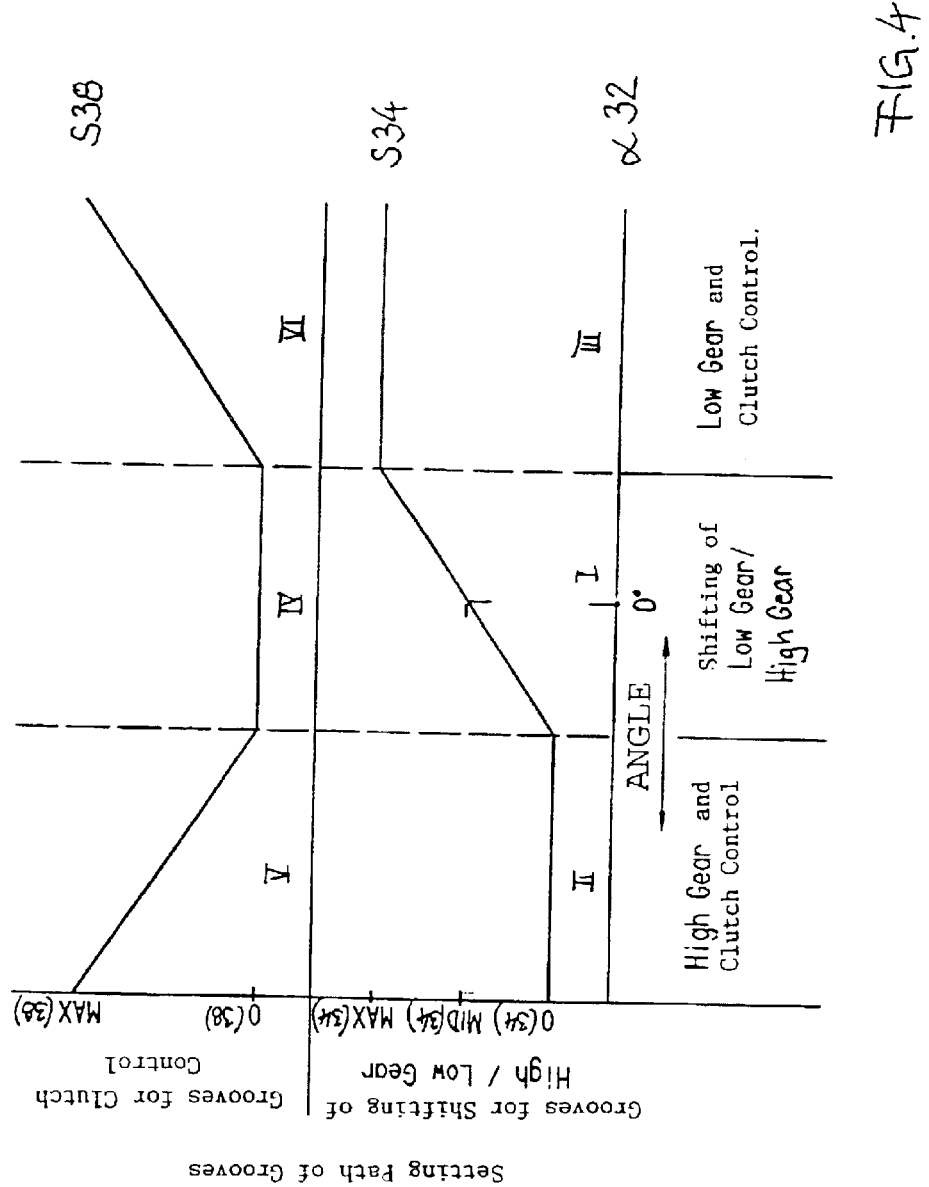
FIG. 4, in a path-angle diagram, shows how the mechanism according to FIGS. 1 to 3 functions.

Two diagrams in FIG. 4 show the settable path S34 of the first outer disc at the bottom and the displacement path S38 of the second outer disc at the top as a function of the angle of rotation α32 of the central disc. Because of the shape of the grooves 42, 44 between the central disc 32 and the first outer disc 34, the setting path S34, starting from the central position 0° of the central disc 32, on both sides, comprises a central gradient range I which drops linearly from a central setting path MID(34) on one side as far as a minimum setting path 0(34) and which, on the other side, linearly rises to a maximum setting path MAX(34). As a result, when the discs 32, 34 rotate relatively to one another, the shifting yoke 50 and the gearshift sleeve 49, in a first direction of rotation, are moved into engagement with the first transmission stage 22/23 and, in a second direction of engagement, with a second transmission stage 24/25. As soon as the shifting yoke 50 has reached these positions, the axial path S34 of the first outer disc 34 no longer changes when the central disc 32 continues to rotate because a neutral gradient range II follows in one direction of rotation and a neutral gradient range III follows in the other direction of rotation. Because of the shape of the grooves between the central disc 32 and the second outer disc 38, the setting path S38, starting from the central position 0° of the central disc 32, in a central range which is identical to the above-mentioned central range, at a minimum setting path 0(38), comprises a non-effective neutral gradient range IV in both directions, which neutral gradient range IV corresponds to an open friction clutch 81. As soon as in one direction of rotation of the central disc 32, one of the transmission stages 22/23, 24/25 is engaged completely, there additionally follow, with a further relative rotation, the gradient ranges V and VI in both directions, with the setting path rising linearly, as a result of which the friction clutch 81 is closed in each of the two stages at a constant rate. The maximum settable path MAX (38) corresponds to the completely closed friction clutch 81.

As indicated by the lettering, there exists a central range of rotation around the central position °0 in which the clutch is permanently fully open and in which the two-stage gearbox is switched between the low transmission stage (low gear) and the high transmission stage (high gear); furthermore, there exist two end ranges in which one of the transmission stages is engaged and in which the friction clutch is going to be progressively closed.

FIGS. 5 and 6 show the central disc 32 in a first view A—A and the first outer disc 34 in view B—B. It can be seen that, for rotating purposes, the central disc 32 comprises the tooth segment 33 and that the first outer disc 34 comprises the driving head 35. Both discs can be seen to comprise three identically designed circumferentially extending ball grooves 42, 44 which, if mounted as specified, extend in opposite directions relative to one another. The ball grooves each comprise a central range 42I, 44I with a continuously changing depth which, in the case of rotation, lead to a displacement of the shifting claw, as well as two adjoining ranges 42II, 44II of a smaller depth and 42III, 44III of a greater depth which, if rotation continues, leave the shifting claw in the position it has reached and thus leave the shifted gear stage unchanged.

FIGS. 7 and 8 show the central disc 32 with the tooth segment 33 on the circumference in view C—C and, in the view D—D, the second outer disc 38 with the driving claw 39 at the circumference, which two discs 32, 38 each comprise three ball grooves which correspond to one another. Each one of the ball grooves 46, 48 comprises a central portion 46IV, 48IV whose depth remains unchanged and which do not have a setting effect, as well as end portions 46V, 46VI, 48V, 48VI of a decreasing depth and thus of increasing setting paths.

From the foregoing, it can be seen that there has been brought to the art a new and improved actuating mechanism for an axial setting device. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. An actuating mechanism (31) for axial setting purposes, comprising:
   a central disc (32) and first and second outer discs (34, 38) all supported co-axially relative to an axis, the central disc (32) being rotatable relative to the two outer discs (34, 38);
   sets of balls (43, 47) arranged between the central disc (32) and each of the outer discs (34, 38), sets of balls (43, 47) each running in pairs of circumferential grooves (42, 44; 46, 48) in faces of the central disc (32) and of one of the outer discs (34, 38) facing one another, the circumferential grooves (42, 44, 46, 48) comprising a circumferentially variable depth whose extension is such that, over the entire relative angle of rotation (α32), the first outer disc (34) moves axially from a first end position (0(34)) via a central position (MID(34)) into a second end position (MAX(34)) which deviates from said first end position, and the second outer disc (38) moves axially from a first end position (MAX(38)) via a second end position (0(38)) deviating therefrom back into the first end position (MAX(38)); and a single rotary drive (91) for rotating the central, first and second the discs (32, 34, 38) relative to one another.

2. An actuating mechanism according to claim 1, wherein the central disc (32) is driven by the rotary drive (91) and the outer discs (34, 38) are held in a rotationally fast way in a housing (11).

3. An actuating mechanism according to claim 1, wherein the central disc (32) is held in a rotationally fast way in a housing (11) and the outer discs (34, 38) are driven synchronously by the rotary drive (91).

4. A mechanism according to claim 1, wherein the central disc (32) and the outer discs (34, 38) are driven simultaneously by the rotary drive (91) in opposite directions of rotation.

5. A mechanism according to claim 1, wherein the first outer disc (34), over a first range (II) of the angle of rotation, holds, without changing, its first end position (0(34)), over a second range (I) of the angle of rotation, is axially transferred from the first end position (0(34)) into the second end position (MAX(34)) and, over a third range (III) of the angle of rotation, holds, without changing, the second end position (MAX(34)), and wherein the second outer disc (38), over the first range (V) of the angle of rotation, changes axially from its first end position (MAX(38)) into the second end position (0(38)), over the second range (IV) of the angle of rotation, holds, without changing, the second end position (0(38)) and, over the third range (VI) of the angle of rotation, axially changes back from the second end position (0(38)) into the first end position (MAX(38)).

6. A mechanism according to claim 2, wherein the first outer disc (34), over a first range (II) of the angle of rotation, holds, without changing, its first end position (0(34)), over a second range (I) of the angle of rotation, is axially transferred from the first end position (0(34)) into the second end position (MAX(34)) and, over a third range (III) of the angle of rotation, holds, without changing, the second end position (MAX(34)), and wherein the second outer disc (38), over the first range (V) of the angle of rotation, changes axially from its first end position (MAX(38)) into the second end position (0(38)), over the second range (IV) of the angle of rotation, holds, without changing, the second end position (0(38)) and, over the third range (VI) of the angle of rotation, axially changes back from the second end position (0(38)) into the first end position (MAX(38)).

7. A mechanism according to claim 3, wherein the first outer disc (34), over a first range (II) of the angle of rotation, holds, without changing, its first end position (0(34)), over a second range (I) of the angle of rotation, is axially transferred from the first end position (0(34)) into the second end position (MAX(34)) and, over a third range (III) of the angle of rotation, holds, without changing, the second end position (MAX(34)), and wherein the second outer disc (38), over the first range (V) of the angle of rotation, changes axially from its first end position (MAX(38)) into the second end position (0(38)), over the second range (IV) of the angle of rotation, holds, without changing, the second end position (0(38)) and, over the third range (VI) of the angle of rotation, axially changes back from the second end position (0(38)) into the first end position (MAX(38)).

8. A mechanism according to claim 4, wherein the first outer disc (34), over a first range (II) of the angle of rotation, holds, without changing, its first end position (0(34)), over a second range (I) of the angle of rotation, is axially transferred from the first end position (0(34)) into the second end position (MAX(34)) and, over a third range (III) of the angle of rotation, holds, without changing, the second end position (MAX(34)), and wherein the second outer disc (38), over the first range (V) of the angle of rotation, changes axially from its first end position (MAX(38)) into the second end position (0(38)), over the second range (IV) of the angle of rotation, holds, without changing, the second end position (0(38)) and, over the third range (VI) of the angle of rotation, axially changes back from the second end position (0(38)) into the first end position (MAX(38)).

9. An actuating mechanism (31) for axial setting purposes, comprising:

a central disc (32) and first and second outer discs (34, 38) all supported co-axially relative to an axis, the central disc (32) being rotatable relative to the two outer discs (34, 38);

sets of balls (43, 47) arranged between the central disc (32) and each of the outer discs (34, 38), the sets of balls (43, 47) each running in pairs of circumferential grooves (42, 44; 46, 48) in faces of the central disc (32) and of one of the outer discs (34, 38) facing one another, the circumferential grooves (42, 44, 46, 48) comprising a circumferentially variable depth whose extension is such that, over the entire relative angle of rotation ($\alpha$32), the first outer disc (34) moves axially from a first end position (0(34)) via a central position (MID(34)) into a second end position (MAX(34)) which deviates from said first end position, and the second outer disc (38) moves axially from a first end position (MAX(38)) via a second end position (0(38)) deviating therefrom back into the first end position (MAX(38));

wherein the first outer disc (34), over a first range (II) of the angle of rotation, holds, without changing, its first end position (0(34)), over a second range (I) of the angle of rotation, is axially transferred from the first end position (0(34)) into the second end position (MAX(34)) and, over a third range (III) of the angle of rotation, holds, without changing, the second end position (MAX(34)), wherein the second outer disc (38), over the first range (V) of the angle of rotation, changes axially from its first end position (MAX(38)) into the second end position (0(38)), over the second range (IV) of the angle of rotation, holds, without changing, the second end position (0(38)) and, over the third range (VI) of the angle of rotation, axially changes back from the second end position (0(38)) into the first end position (MAX(38)), wherein the first outer disc (34) is connected by a shift fork (50) to a gearshift sleeve (49) for the purpose of changing gear between two transmission stages (22/23; 24/25) and the second outer disc (38) acts mechanically on a pressure plate (56) of a friction coupling (81).

10. An intermediate axle drive for a vehicle driven by several axles, comprising a two-stage gearbox (21) and a follow-up central differential (71) with a locking coupling (81), the intermediate axle gearbox comprising an actuating mechanism (31) for axial setting purposes, the actuating mechanism comprising:

a central disc (32) and first and second outer discs (34, 38) all supported co-axially relative to an axis, the central disc (32) being rotatable relative to the two outer discs (34, 38);

sets of balls (43, 47) arranged between the central disc (32) and each of the outer discs (34, 38), the sets of balls (43, 47) each running in pairs of circumferential grooves (42, 44; 46, 48) in the faces of the central disc (32) and of one of the outer discs (34, 38) facing one another, the circumferential grooves (42, 44, 46, 48) comprising a circumferentially variable depth whose extension is such that, over of the entire relative angle of rotation, the first outer disc (34) moves axially from a first end position (0(34)) via a central position (MID(34)) into a second end position (MAX(34)) which deviates from said first end position, the second outer disc (38) moves axially from a first end position (MAX(38)) via a second end position (0(38)) deviating therefrom back into the first end position (MAX(38)), and wherein the first outer disc (34) is connected by a shift fork (50) to a gearshift sleeve (49) for the two-stage gearbox (21), and the second outer disc (38) acts on a pressure plate (56) of the locking coupling (81) of the central differential (71).

11. A drive according to claim 10, wherein the central differential is a planetary drive.

12. A drive according to claim 11, wherein an intermediate shaft (15) of the two-stage gearbox (21) is connected to the web (72) of the planetary drive, and the sun gear (75) and the hollow gear (76) of the planetary drive are drivingly connected to a first output shaft (29) and to a second output shaft (30).

13. A drive according to claim 11, wherein the locking coupling (81) is effective between the web (72) and the hollow gear (76) of the planetary drive.

14. A drive according to claim 10, wherein an intermediate shaft (15) of the two-stage gearbox (21) can be effectively connected to an input shaft (14) by way of two pairs of gearwheels (22, 23, 24, 25) which engage one another permanently in two controllable transmission stages.

15. A drive according to claim 11, wherein an intermediate shaft (15) of the two-stage gearbox (21) can be effectively connected to an input shaft (14) by way of two pairs of gearwheels (22, 23, 24, 25) which engage one another permanently in two controllable transmission stages.

16. A drive according to claim 12, wherein the intermediate shaft (15) of the two-stage gearbox (21) can be effectively connected to an input shaft (14) by way of two pairs of gearwheels (22, 23, 24, 25) which engage one another permanently in two controllable transmission stages.

* * * * *